United States Patent
Ohba et al.

(10) Patent No.: US 8,864,384 B2
(45) Date of Patent: Oct. 21, 2014

(54) ROLLING BEARING WITH SEAL

(71) Applicants: Keihin Corporation, Tokyo (JP); Minebea Co., Ltd., Kitasaku-gun (JP)

(72) Inventors: Tomoaki Ohba, Tochigi (JP); Takuya Usami, Tochigi (JP); Kenichiro Nishimura, Kitasaku-gun (JP); Akimi Furukoshi, Kitasaku-gun (JP)

(73) Assignees: Keihin Corporation, Tokyo (JP); Minebea Co., Ltd., Nagano (JP)

( * ) Notice: Subject to any disclaimer, the term of this patent is extended or adjusted under 35 U.S.C. 154(b) by 0 days.

(21) Appl. No.: 13/847,385

(22) Filed: Mar. 19, 2013

(65) Prior Publication Data

US 2013/0279839 A1    Oct. 24, 2013

(30) Foreign Application Priority Data

Mar. 30, 2012   (JP) .................................. 2012-082325

(51) Int. Cl.

| | | |
|---|---|---|
| *F16C 33/78* | (2006.01) | |
| *F16J 15/32* | (2006.01) | |
| *F02D 9/10* | (2006.01) | |
| *F16K 1/226* | (2006.01) | |
| *F16C 33/76* | (2006.01) | |
| *F16J 15/16* | (2006.01) | |
| *F16C 19/06* | (2006.01) | |

(52) U.S. Cl.

CPC ................ *F16C 33/76* (2013.01); *F16C 19/06* (2013.01); *F16C 2360/22* (2013.01); *F02D 9/106* (2013.01); *F16K 1/2268* (2013.01); *F16C 2361/91* (2013.01); *F16C 33/7823* (2013.01); *F16C 33/7856* (2013.01); *F16J 15/322* (2013.01); *F16J 15/164* (2013.01)

USPC ............ 384/482; 384/484; 384/607; 277/353

(58) Field of Classification Search

USPC ......... 384/477, 482, 484–486, 490, 548, 607; 277/345, 421, 561, 564–565, 574–575, 277/353

See application file for complete search history.

(56) References Cited

U.S. PATENT DOCUMENTS

| | | | | |
|---|---|---|---|---|
| 3,414,275 A | * | 12/1968 | Takahashi ..................... | 277/421 |
| 3,423,140 A | * | 1/1969 | Cowles ......................... | 384/486 |
| 3,473,856 A | * | 10/1969 | Helms ........................... | 384/482 |
| 3,752,543 A | * | 8/1973 | Schmidt ........................ | 384/484 |

(Continued)

FOREIGN PATENT DOCUMENTS

| | | | | | |
|---|---|---|---|---|---|
| JP | 01182619 A | * | 7/1989 | ............. | F16C 27/06 |
| JP | 2004019722 A | * | 1/2004 | ............. | F16C 33/78 |
| JP | 2004-263734 A | | 9/2004 | | |

*Primary Examiner* — Marcus Charles
(74) *Attorney, Agent, or Firm* — Arent Fox LLP (57) ABSTRACT

A seal lip having: a cylindrical seal surface in close contact with an outer peripheral surface of an inner race with outer side and inner side surfaces standing upright respectively from an outer end and an inner end of the seal surface and reaching a lip supporting portion of a seal member, and protruding on an inner peripheral surface of the lip supporting portion. The outer side surface is a perpendicular surface standing upright from the outer end of the seal surface in a direction perpendicular to a generating line of the outer peripheral surface of the inner race. The inner side surface includes: a perpendicular surface standing upright from the inner end of the seal surface in parallel with the outer side surface; and a conical surface inclined toward the outer side surface extending outward in a radial direction from an outer peripheral end of the perpendicular surface.

9 Claims, 3 Drawing Sheets

(56) References Cited

U.S. PATENT DOCUMENTS

| | | | |
|---|---|---|---|
| 3,854,734 A * | 12/1974 | West | 277/565 |
| 4,805,919 A * | 2/1989 | Wiblyi et al. | 277/560 |
| 4,872,770 A * | 10/1989 | Dickinson | 384/484 |
| 5,383,728 A * | 1/1995 | Micca et al. | 384/484 |
| 5,649,772 A * | 7/1997 | Schlereth et al. | 384/484 |
| 5,683,186 A * | 11/1997 | Akimoto | 384/607 |
| 5,909,880 A * | 6/1999 | Waskiewicz | 277/561 |
| 7,591,593 B2 * | 9/2009 | Tsujimoto | 384/486 |

* cited by examiner

ROLLING BEARING WITH SEAL

CROSS-REFERENCED TO RELATED APPLICATIONS

This application is based upon and claims priority to Japanese Patent Application No. 2012-082325, filed Mar. 30, 2012, the disclosure of the prior application is hereby incorporated in its entirety by reference.

BACKGROUND OF THE INVENTION

1. Field of the Invention

The present invention relates to an improvement of a rolling bearing with seal comprising: an inner race; an outer race surrounding the inner race; a plurality of rolling members arranged circumferentially and interposed between the inner and outer races; and a pair of annular seal members disposed between the inner and outer races in such a manner as to cover opposite sides of the rolling members, wherein an attachment bead to be fixed to the outer race is formed on an outer periphery of each of the seal members, and a seal lip rotatably and slidably being in close contact with an outer peripheral surface of the inner race is formed on an inner periphery of each of the seal members.

2. Description of the Related Art

Such a rolling bearing with seal is, as disclosed in Japanese Patent Application Laid-open No. 2004-263734, interposed between a partition wall, between two chambers having different internal pressures, and a rotary shaft penetrating the partition wall. The rolling bearing with seal is capable of preventing pressure shift between the two chambers while securing smooth rotation of the rotary shaft.

Meanwhile, in the seal member of the rolling bearing with seal described in Japanese Patent Application Laid-open No. 2004-263734 above, the seal lip being in close contact with the outer peripheral surface of the inner race is formed in such a frusto-conical shape as to extend toward an outer side of the inner race while extending inward in a radial direction of an inner race. For this reason, when a large negative pressure is generated in the chamber which the seal lip faces, the negative pressure acts on an outer peripheral surface of the seal lip with the frusto-conical shape, trying to float up the seal lip away from the outer peripheral surface of the inner race. This weakens a sealing pressure of the seal lip against the inner race, possibly causing grease inside the bearing from flowing out.

SUMMARY OF THE INVENTION

The present invention has been made in view of the above-described circumstances, and an object of the present invention is to provide the rolling bearing with seal with a simple structure including a seal member which is capable of making a sealing pressure of a seal lip against an inner race higher than usual as a negative pressure, which acts on an outer side of the seal lip, becomes higher and also does not change a sealing area of a seal surface of the seal lip, which is in close contact with the inner race, even when the seal surface is worn, thereby being capable of always exhibiting a favorable sealing function.

In order to achieve the object, according to a first feature of the present invention, there is provided a rolling bearing with seal comprising: an inner race; an outer race surrounding the inner race; a plurality of rolling members arranged circumferentially and interposed between the inner and outer races; and a pair of annular seal members disposed between the inner and outer races in such a manner as to cover opposite sides of a group of the rolling members, wherein an attachment bead to be fixed to the outer race is formed on an outer periphery of each of the seal members, wherein a seal lip rotatably and slidably being in close contact with an outer peripheral surface of the inner race is formed on an inner periphery of each of the seal members, wherein an annular lip supporting portion having a larger thickness than that of the seal lip is formed on the inner periphery side of the seal member, wherein the seal lip protrudes on an inner peripheral surface of the lip supporting portion, the seal lip having: a cylindrical seal surface being in close contact with the outer peripheral surface of the inner race; and an outer side surface and an inner side surface standing upright respectively from an outer end and an inner end of the seal surface and reaching the lip supporting portion, wherein the outer side surface is formed as a perpendicular surface standing upright from the outer end of the seal surface in a direction perpendicular to a generating line of the outer peripheral surface of the inner race, and wherein the inner side surface includes: a perpendicular surface standing upright from the inner end of the seal surface in parallel with the outer side surface; and a conical surface inclined toward the outer side surface while extending outward in a radial direction from an outer peripheral end of the perpendicular surface, and reaching the lip supporting portion. Here, the rolling member corresponds to a ball 32 in embodiments of the present invention, which will be described later.

With the first feature of the present invention, the annular lip supporting portion having a larger thickness than that of the seal lip is formed on the inner peripheral side of the seal member, and the seal lip protrudes on the inner peripheral surface of the lip supporting portion, the seal lip having: the cylindrical seal surface being in close contact with the outer peripheral surface of the inner race; and the outer side surface and the inner side surface standing upright respectively from the outer end and the inner end of the seal surface and reaching the lip supporting portion. Accordingly, even when an axial load due to a pressure difference between the inner and outer sides of the seal member is applied to the seal lip of the seal member, the seal lip having the cylindrical wide seal surface being in close contact with the outer peripheral surface of the inner race exhibits a large stiffness and thus is not tilted in the axial direction.

Moreover, the outer side surface of the seal lip is formed as the perpendicular surface standing upright from the outer end of the seal surface in the direction perpendicular to the generating line of the outer peripheral surface of the inner race, and the inner side surface of the seal lip includes: the perpendicular surface standing upright from the inner end of the seal surface in parallel with the outer side surface; and the conical surface inclined toward the outer side surface while extending outward in the radial direction from the outer peripheral end of the perpendicular surface, and reaching the lip supporting portion. Accordingly, when a negative pressure acts on the outer side surface of the seal lip, a load due to a differential pressure between the negative pressure and an atmospheric pressure on an inner side of the seal lip perpendicularly presses the conical surface of the conical inner side surface of the seal lip. Accordingly, a radial component force of the load presses the seal lip against the outer peripheral surface of the inner race. As a result, the higher the negative pressure, the higher a seal pressure of the seal surface against the inner race. Moreover, even when the seal surface of the seal lip is worn by sliding friction with the inner race, a sealing area of the seal surface, which is in close contact with the inner race, does not change. Therefore, the sealing function can be stabilized. In this way, the seal lip is capable of always maintaining an appropriate close contact state of the seal surface against the outer peripheral surface of the inner race even when receiving large positive pressure and negative pressure on the outer side surface thereof, or when the seal surface is worn. Therefore, it is possible to surely prevent grease inside the bearing from flowing out, and to provide a rolling bearing with seal having a high durability with a simple structure.

According to a second feature of the present invention, in addition to the first feature, width of a root of the seal lip in an axial direction is set to be larger than a height of the seal lip in the radial direction.

With the second feature of the present invention, setting the width of the root of the seal lip in the axial direction larger than the height of the seal lip in the radial direction further enhances a tilt stiffness of the seal lip in the axial direction, thus making it possible to surely prevent the tilting of the seal lip.

According to a third feature of the present invention, in addition to the first or second feature, an annular recess portion recessed to immediately above the seal lip is formed in an outer side surface of the lip supporting portion.

With the third feature of the present invention, the annular recess portion recessed to immediately above the seal lip is formed in the outer side surface of the lip supporting portion. Accordingly, a supporting stiffness of the lip supporting portion for the seal lip can be appropriately reduced by the depth of the recess portion, making it possible to adjust a friction torque between the seal lip and the inner race. Therefore, a change in an allowable rotational torque of the inner race can be dealt with.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention will be described below on the basis of preferred embodiments of the present invention which are shown in the drawings.

Figure 1:
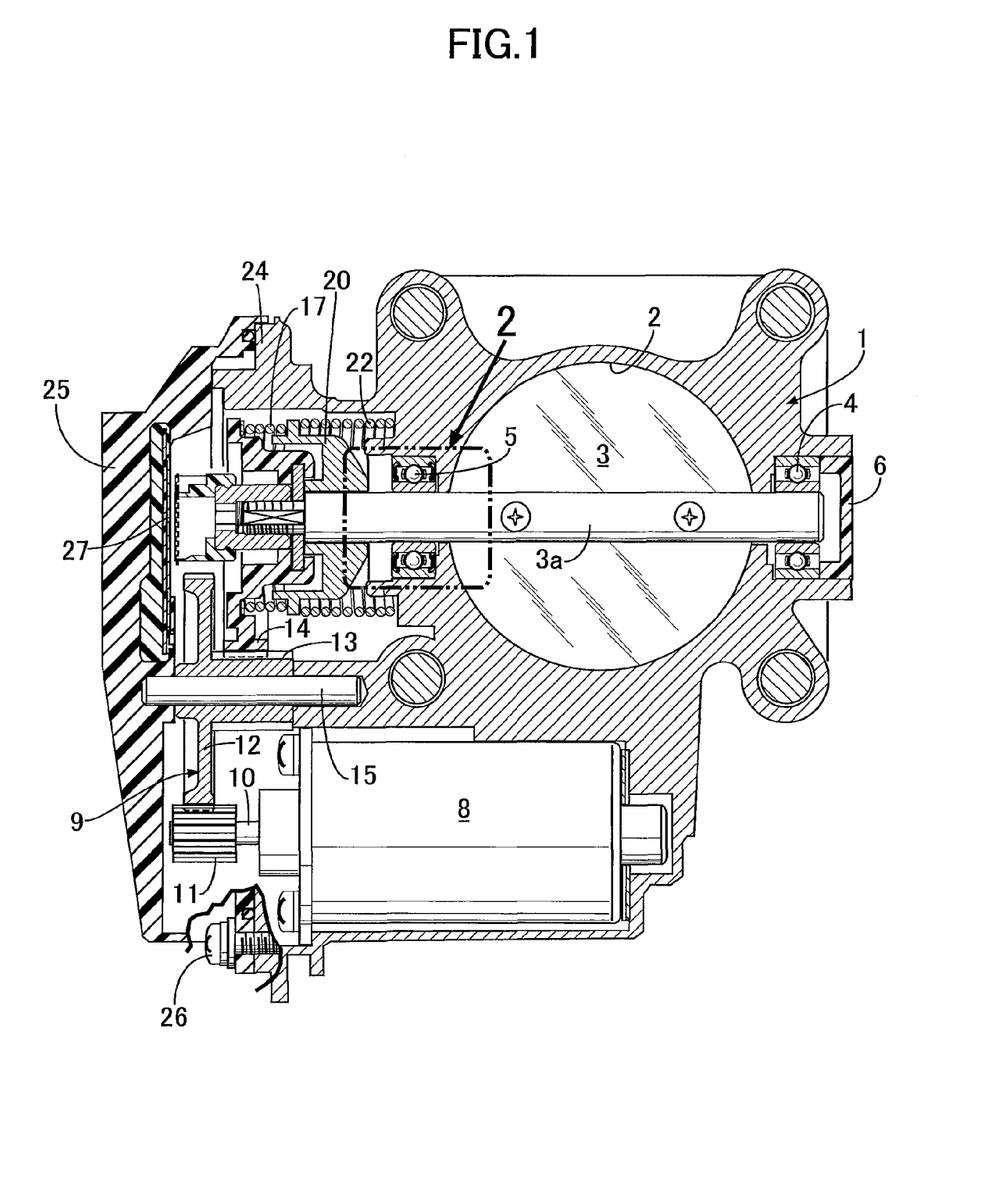
FIG. 1 is a sectional view of an intake control device of an engine, including a rolling bearing with seal according to a first embodiment of the present invention.

In FIG. 1, a throttle body 1, which constitutes a part of an intake system of an engine for a vehicle such as a two-wheeled motor vehicle and an automobile, has an intake passage 2, which communicates with an intake port of the engine, at a center portion of the throttle body 1. A valve stem 3a of a butterfly-type throttle valve 3 configured to open and close the intake passage 2 is rotatably supported on both left and right sidewalls of the throttle body 1 by a pair of rolling bearings 4 and 5. In this connection, the rolling bearing 5 on the left side, in particular, is a rolling bearing with seal, which will be described in detail later.

A cap 6 configured to cover a right end portion of the throttle valve 3 and the rolling bearing 4 is fitted in the right sidewall of the throttle body 1. In addition, a left end portion of the valve stem 3a protrudes outward from the left sidewall of the throttle body 1, and an electric motor 8 configured to drive the throttle valve 3 to open and close is coupled to the protruding end portion of the valve stem 3a through a reduction gear mechanism 9. The reduction gear mechanism 9 includes: a primary drive gear 11 fixedly attached on an output shaft 10 of the electric motor 8; a primary follower gear 12 rotatably supported on an intermediate shaft 15 and meshing with the primary drive gear 11; a secondary drive gear 13 formed integrally on one side of the primary follower gear 12; and a sector-type secondary follower gear 14 fixedly attached to the left end portion of the valve stem 3a and meshing with the secondary drive gear 13. The reduction gear mechanism 9 is capable of transmitting a rotation of the output shaft 10 of the electric motor 8 to the valve stem 3a while reducing the speed thereof in two stages, thus opening and closing the throttle valve 3. The valve stem 3a, the output shaft 10, and the intermediate shaft 15 are arranged such that axes of these are perpendicular to an axis of the intake passage 2 and in parallel with one another.

A closing spring 17 configured to bias the secondary follower gear 14 in a closing direction of the throttle valve 3 is connected to the secondary follower gear 14. In addition, a default lever 20 is rotatably supported on the valve stem 3a adjacent to the secondary follower gear 14. An opening spring 22 having a spring force larger than that of the closing spring 17 and configured to bias the default lever 20 in an opening direction of the throttle valve 3 is connected to the default lever 20. When turned in the opening direction of the throttle valve 3 by the biasing force of the opening spring 22, the default lever 20 drives the throttle valve 3 in the opening direction via the secondary follower gear 14. A default stopper bolt (not shown) configured to receive the default lever 20 to stop an opening of the throttle valve 3 from an idling opening degree thereof at a predetermined default opening degree is attached to the throttle body 1. Accordingly, during the operation of the engine, when the electric motor 8 becomes incapable of being supplied with electricity, the throttle valve 3 is maintained at the default opening degree by the biasing force of the opening spring 22. Thus, the engine is supplied with an amount of intake air that allows the vehicle to drive at a very low speed to a maintenance factory.

A control case 24 housing the electric motor 8, the reduction gear mechanism 9, and the like is formed integrally on the left sidewall of the throttle body 1. A case cover 25 made of a synthetic resin and configured to close an opening portion of the control case 24 is joined to a left end surface of the control case 24 with a bolt 26. A throttle sensor 27 configured to detect an angle of rotation of the valve stem 3a as the opening degree of the throttle valve 3 is provided in the case cover 25. In addition, a ventilating hole (not shown) for ventilating an inside of the control case 24 in order to prevent dew condensation in the control case 24 is provided in the case cover 25, and thus the inside of the control case 24 is always kept at atmospheric pressure.

Figure 2:
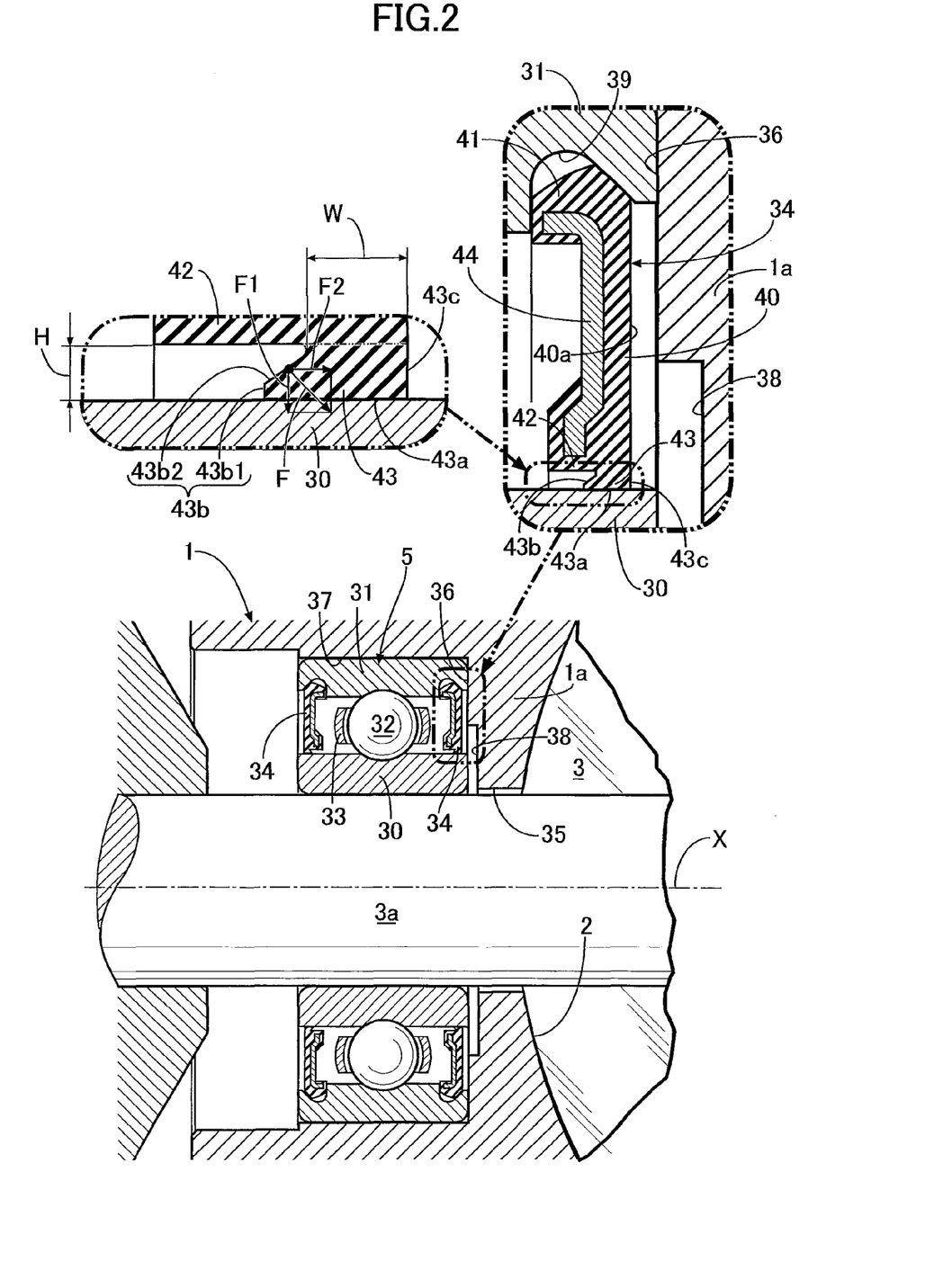
FIG. 2 is an enlarged view of a part 2 in FIG. 1.

Now, referring to FIG. 2, the rolling bearing 5 with seal on the control case 24 side, which rotatably supports the valve stem 3a, will be described.

The rolling bearing 5 with seal includes: an inner race 30; an outer race surrounding the inner race 30; a plurality of balls 32 arranged circumferentially and interposed between the inner and outer races 30 and 31; a retainer 33 retaining the group of balls 32; and a pair of annular seal members 34 disposed between the inner and outer races 30 and 31 in such a manner as to cover the group of the balls 32 from opposite sides. Grease for lubrication (not shown) is applied on and around the group of the balls 32.

On the other hand, a stem hole 35, through which the valve stem 3a penetrates, and a bearing housing 37, which is coaxially continuous to the stem hole 35 through a step portion 36 facing the control case 24 side, are formed in a sidewall 1a, on the control case 24 side, of the throttle body 1. An annular clearance recess portion 38 is provided to the step portion 36.

The outer race 31 of the rolling bearing 5 with seal is press-fitted into the bearing housing 37. The inner race 30 is press-fitted onto an outer periphery of the valve stem 3a. At this time, contact between the inner race 30 and the sidewall 1a is avoided by the clearance recess portion 38.

The annular seal member 34 is made of rubber or an elastomer, and includes: a plate-shaped wall 40; an annular attachment bead 41 bulging from an outer peripheral portion of the plate-shaped wall 40 toward the group of the balls 32; an annular lip supporting portion 42 having a large thickness and bulging from an inner peripheral portion of the plate-shaped wall 40 toward the group of the balls 32; and a seal lip 43 protruding on an inner peripheral surface of the lip supporting portion 42. A reinforcement ring 44 made of steel is buried in from the lip supporting portion 42 to the attachment bead 41.

The attachment bead 41 is fitted and fixed in an annular attachment groove 39 provided in an inner peripheral surface of the outer race 31.

Moreover, the seal lip 43 has: a cylindrical seal surface 43a being in close contact with an outer peripheral surface of the inner race 30 with a certain interference; and an outer side surface 43c and an inner side surface 43b standing upright respectively from an outer end and an inner end of the seal surface 43a. The outer side surface 43c includes a perpendicular surface standing upright from the outer end of the seal surface 43a in a direction perpendicular to a generating line of an outer peripheral surface of the inner race 30 and reaching the inner peripheral surface of the lip supporting portion 42. The inner side surface 43b includes: a perpendicular surface 43b1 standing upright from the inner end of the seal surface 43a in parallel with the outer side surface 43c; and a conical surface 43b2 inclined toward the outer side surface 43c side while extending outward in a radial direction from an outer peripheral end of the perpendicular surface 43b1, and reaching the inner peripheral surface of the lip supporting portion 42. In this connection, a width W of a root of the seal lip 43, that is, a portion coupled to the lip supporting portion 42, in an axial direction is set to be larger than a height H of the seal lip 43 in the radial direction. Note that the fact that the outer side surface 43c stands upright in the direction perpendicular to the generating line of the outer peripheral surface of the inner race 30 may be rephrased as the outer side surface 43c stands upright in a direction perpendicular to a center axis X of the inner race 30.

The outer side surface 43c of the seal lip 43 is located to be flush with or near an outer side surface 40a of the plate-shaped wall 40 while the inner side surface 43b thereof is located in an intermediate portion of the lip supporting portion 42 in the axial direction. Accordingly, the seal lip 43 is offset from the center portion of the lip supporting portion 42 in the axial direction toward an outer side of the inner race 30, and an inner peripheral end of the reinforcement ring 44 is offset from the seal lip 43 toward an inner side of the seal member 34 so as not to reduce an elasticity of the seal lip 43.

In this way, the pair of left and right seal members 34 disposed between the inner race 30 and the outer race 31 have a symmetrical structure, which makes it unnecessary to restrict a mounting direction of the rolling bearing 5 with seal when the rolling bearing 5 with seal is mounted to the bearing housing 37 and the valve stem 3a.

Next, operation of the first embodiment will be described.

During the operation of the engine, the throttle valve 3 is driven by the electric motor 8 through the reduction gear mechanism 9 to open and close the intake passage 2, thereby controlling the amount of intake air of the engine. At this time, since the valve stem 3a of the throttle valve 3 is rotatably supported by the pair of left and right rolling bearings 4 and 5, the rotation of the valve stem 3a, that is, the opening and closing operation of the throttle valve 3 can be smoothly performed. Moreover, since the rolling bearing 5 on the control case 24 side, in particular, includes the pair of seal members 34 covering opposite sides of the group of the balls 32, the rolling bearing 5 is capable of preventing pressure shift between the intake passage 2 and the control case 24, and preventing the grease inside the rolling bearing 5 with seal from flowing out.

Meanwhile, during the operation of the engine, a positive pressure and a negative pressure are alternately generated inside the intake passage 2 because of intake pulsation of the engine. The pulsating pressure passes through the stem hole 35 and the clearance recess portion 38 and acts on the outer side surface of the seal member 34 on the intake passage 2 side in the rolling bearing 5 with seal. Here, the inside of the control case 24 is always at atmospheric pressure. Accordingly, an outward axial load and an inward axial load associated with a differential pressure between the pulsating pressure (the positive pressure and the negative pressure) and the atmospheric pressure are alternately applied to the seal member 34 on the intake passage 2 side in the rolling bearing 5 with seal, trying to tilt the seal lip 43, which is most flexible in the seal member 34, in the axial direction. However, the seal lip 43, having the cylindrical wide seal surface 43a being in close contact with the outer peripheral surface of the inner race 30, exhibits a large stiffness and thus is not tilted in the axial direction. Furthermore, setting the width W of the root in the axial direction larger than the height H of the seal lip 43 in the radial direction further enhances the tilt stiffness (bending stiffness) of the seal lip 43 in the axial direction, thus making it possible to surely prevent the tilting of the seal lip 43.

In addition, particularly when a negative pressure acts on the outer side surface 43c of the seal lip 43, a load F due to the differential pressure between the negative pressure and the atmospheric pressure inside the control case 24 perpendicularly presses the conical surface 43b2 of the inner side surface 43b of the seal lip 43. Accordingly, a radial component force F1 of the load F presses the seal lip 43 against the outer peripheral surface of the inner race 30. As a result, the higher the negative pressure, the higher a seal pressure of the seal surface 43a against the inner race 30. Note that an axial component force F2 of the load F is the above-described outward axial load trying to tilt the seal lip 43 outward.

Moreover, a portion, which stands upright from the inner end of the seal surface 43a, of the inner side surface 43b of the seal lip 43 is the perpendicular surface 43b1, which is in parallel with the outer side surface 43c arranged in the direction perpendicular to the center axis X of the inner race 30. Accordingly, even when the seal surface 43a is worn by sliding friction with the inner race 30, a sealing area of the seal surface 43a, which is in close contact with the inner race 30, does not change. Therefore, the sealing function can be stabilized.

As described above, the seal lip 43 is capable of always maintaining an appropriate close contact state of the seal surface 43a against the outer peripheral surface of the inner race 30, even when receiving the pulsating pressure in the intake passage 2, or when the seal surface 43a is worn. Therefore, it is possible to surely prevent the grease inside the bearing 5 from flowing out, and to obtain the rolling bearing 5 with seal having a high durability with a simple structure.

Figure 3:
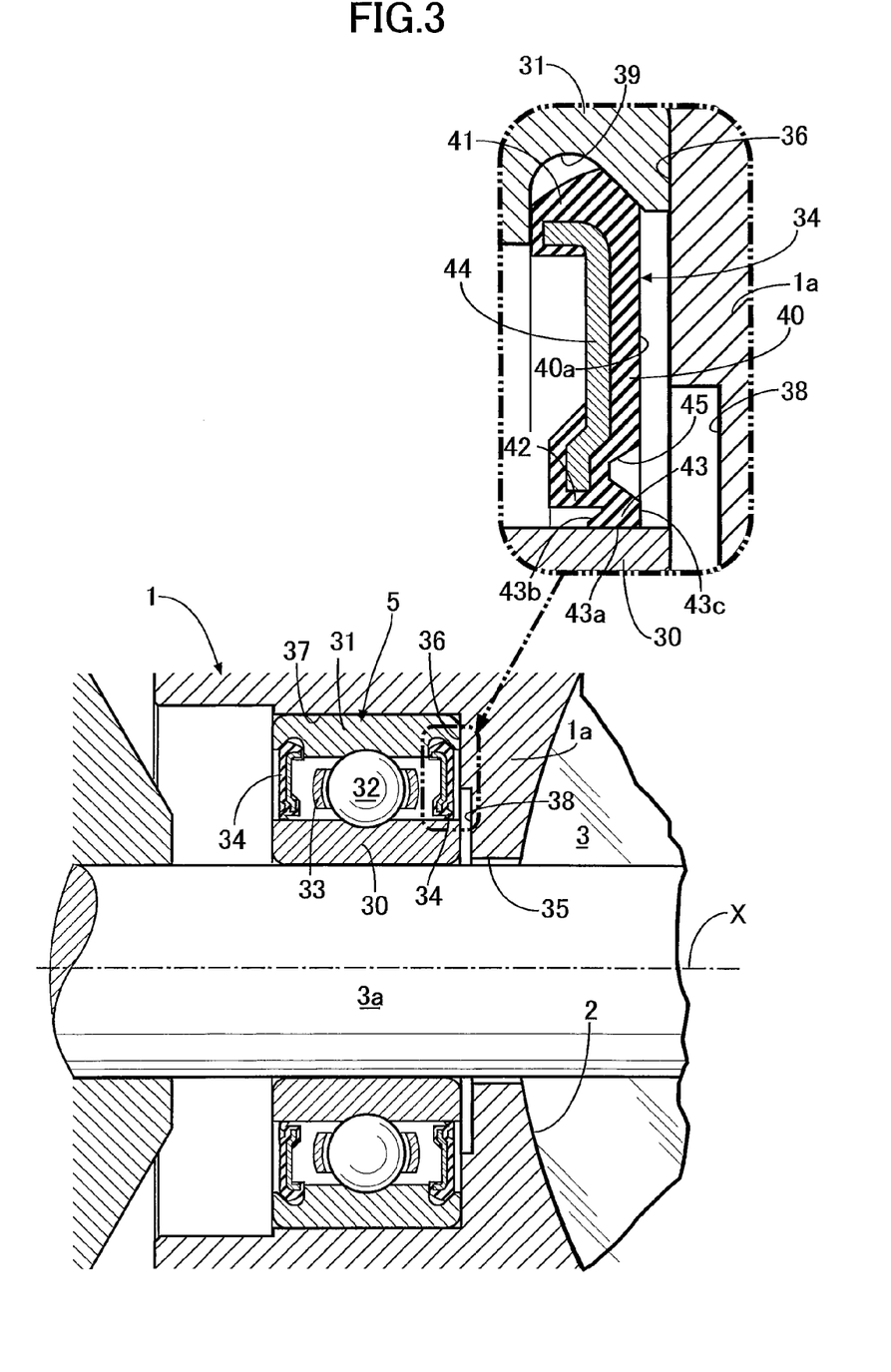
FIG. 3 is a view corresponding to FIG. 2 and showing a second embodiment of the present invention.

Next, a second embodiment of the present invention, which is shown in FIG. 3, will be described.

In the second embodiment, an annular recess portion 45 recessed to immediately above the seal lip 43 is formed in an outer side surface of the lip supporting portion 42 in the seal member 34. The other configurations are the same as those of the aforementioned embodiment, and the portions corresponding to those of the aforementioned embodiment are denoted by the same reference numerals in FIG. 3, and the same description will be omitted.

According to the second embodiment, the supporting stiffness of the lip supporting portion 42 for the seal lip 43 can be appropriately reduced by the depth of the recess portion 45, making it possible to adjust a friction torque between the seal lip 43 and the inner race 30. Therefore, a change in an allowable rotational torque of the valve stem 3a, that is, an allowable rotational torque of the inner race 30 press-fitted and coupled to the valve stem 3a, can be dealt with at the time of changing the specifications of the throttle body 1 or the like.

The present invention is not limited to the above-described embodiments, and various modifications in design may be made without departing from the gist of the present invention. For example, the outer side surface 43c of the seal lip 43 may be formed into a conical shape symmetrical to the inner side surface 43b. Moreover, the rolling bearing 5 with seal of the present invention may be used for supporting a rotary shaft penetrating a partition wall between two chambers having different internal pressures in various kinds of devices other than an intake control device for an engine. Furthermore, the present invention may be applied to a roller bearing having rollers as the rolling members.

What is claimed is:

1. A rolling bearing with seal comprising:
an inner race;
an outer race surrounding the inner race;
a plurality of rolling members arranged circumferentially and interposed between the inner and outer races; and
a pair of annular seal members disposed between the inner and outer races and covering opposite sides of the rolling members,
wherein an attachment bead to be fixed to the outer race is formed on an outer periphery of each of the seal members,
wherein a seal lip rotatably and slidably placed in contact with an outer peripheral surface of the inner race is formed on an inner periphery of each of the seal members,
wherein an annular lip supporting portion having a larger thickness than that of the seal lip, which is measured in a direction along a generating line of the outer peripheral surface of the inner race, is formed on the inner periphery side of the seal member,
wherein the seal lip protrudes from an inner peripheral surface of the lip supporting portion, the seal lip having: a cylindrical seal surface placed in contact with the outer peripheral surface of the inner race; and an outer side surface and an inner side surface standing upright respectively from an outer end and an inner end of the seal surface and reaching the lip supporting portion,
wherein the outer side surface is formed as a perpendicular surface standing upright from the outer end of the seal surface in a direction perpendicular to the generating line of the outer peripheral surface of the inner race, and
wherein the inner side surface includes: a perpendicular surface standing upright from the inner end of the seal surface in parallel with the outer side surface; and a conical surface inclined toward the outer side surface while extending outward in a radial direction from an outer peripheral end of the perpendicular surface, and reaching the lip supporting portion.

2. The rolling bearing with seal according to claim 1, wherein a width of a root of the seal lip in an axial direction is set to be larger than a height of the seal lip in the radial direction.

3. The rolling bearing with seal according to claim 2, wherein an annular recess portion is formed in a recessed manner at a position immediately above the seal lip in an outer side surface of the lip supporting portion,
the inner peripheral surface of the lip supporting portion directly faces and extends substantially parallel to the outer peripheral surface of the inner race,
a space is defined between the inner peripheral surface of the lip supporting portion and the perpendicular surface, and
the annular recess portion is offset from said space in the direction of the generating line of the outer peripheral surface of the inner race when viewed in the direction perpendicular to the generating line.

4. The rolling bearing with seal according to claim 2, wherein an annular recess portion is formed in a recessed manner at a position immediately above the seal lip in an outer side surface of the lip supporting portion,
the inner peripheral surface of the lip supporting portion directly faces and extends substantially parallel to the outer peripheral surface of the inner race,
a space is defined between the inner peripheral surface of the lip supporting portion and the perpendicular surface, and
the annular recess portion is offset from said space in the direction of the generating line of the outer peripheral surface of the inner race when viewed in the direction perpendicular to the generating line.

5. The rolling bearing with seal according to claim 1, wherein an annular recess portion is formed in a recessed manner at a position immediately above the seal lip in an outer side surface of the lip supporting portion,
the inner peripheral surface of the lip supporting portion directly faces and extends substantially parallel to the outer peripheral surface of the inner race,
a space is defined between the inner peripheral surface of the lip supporting portion and the perpendicular surface, and
the annular recess portion is offset from said space in the direction of the generating line of the outer peripheral surface of the inner race when viewed in the direction perpendicular to the generating line.

6. The rolling bearing with seal according to claim 1, wherein
the seal lip and the annular lip supporting portion are connected together via a root of the seal lip,
the inner end of the seal surface is connected to the root of the seal lip via said perpendicular surface and the conical surface, and
the perpendicular surface is formed within a region defined by the inner peripheral surface of the lip supporting portion in an axial direction of the inner race.

7. The rolling bearing with seal according to claim 6, wherein a width of the root of the seal lip in the axial direction is set to be larger than a height of the deal lip in the radial direction.

8. The rolling bearing with seal according to claim 7, wherein an annular recess portion is formed in a recessed manner at a position immediately above the seal lip in an outer side surface of the lip supporting portion, the inner peripheral surface of the lip supporting portion directly faces and extends substantially parallel to the outer peripheral surface of the inner race, a space is defined between the inner peripheral surface of the lip supporting portion and the perpendicular surface, and the annular recess portion is offset from said space in the direction of the generating line of the outer peripheral surface of the inner race when viewed in the direction perpendicular to the generating line.

9. The rolling bearing with seal according to claim 6, wherein an annular recess portion is formed in a recessed manner at a position immediately above the seal lip in an outer side surface of the lip supporting portion, the inner peripheral surface of the lip supporting portion directly faces and extends substantially parallel to the outer peripheral surface of the inner race, a space is defined between the inner peripheral surface of the lip supporting portion and the perpendicular surface, and the annular recess portion is offset from said space in the direction of the generating line of the outer peripheral surface of the inner race when viewed in the direction perpendicular to the generating line.

\* \* \* \* \*

UNITED STATES PATENT AND TRADEMARK OFFICE
CERTIFICATE OF CORRECTION

PATENT NO. : 8,864,384 B2
APPLICATION NO. : 13/847385
DATED : October 21, 2014
INVENTOR(S) : Tomoaki Ohba It is certified that error appears in the above-identified patent and that said Letters Patent is hereby corrected as shown below:

Column 8 - Column 9, delete claim 5 in its entirety, claims should read as follows:

5. The rolling bearing with seal according to claim 1,
wherein
  the seal lip and the annular lip supporting portion are con-
      nected together via a root of the seal lip,
  the inner end of the seal surface is connected to the root of
      the seal lip via said perpendicular surface and the conical
      surface, and
  the perpendicular surface is formed within a region defined
      by the inner peripheral surface of the lip supporting
      portion in an axial direction of the inner race.

6. The rolling bearing with seal according to claim 5,
wherein a width of the root of the seal lip in the axial direction
is set to be larger than a height of the seal lip in the radial
direction.

7. The rolling bearing with seal according to claim 2,
wherein an annular recess portion is formed in a recessed
manner at a position immediately above the seal lip in an outer
side surface of the lip supporting portion,
  the inner peripheral surface of the lip supporting portion
      directly faces and extends substantially parallel to the
      outer peripheral surface of the inner race,
  a space is defined between the inner peripheral surface of
      the lip supporting portion and the perpendicular surface,
      and Signed and Sealed this
Twelfth Day of January, 2016

Michelle K. Lee
*Director of the United States Patent and Trademark Office* the annular recess portion is offset from said space in the direction of the generating line of the outer peripheral surface of the inner race when viewed in the direction perpendicular to the generating line.

8. The rolling bearing with seal according to claim 5, wherein an annular recess portion is formed in a recessed manner at a position immediately above the seal lip in an outer side surface of the lip supporting portion,
- the inner peripheral surface of the lip supporting portion directly faces and extends substantially parallel to the outer peripheral surface of the inner race,
- a space is defined between the inner peripheral surface of the lip supporting portion and the perpendicular surface, and
- the annular recess portion is offset from said space in the direction of the generating line of the outer peripheral surface of the inner race when viewed in the direction perpendicular to the generating line.

\* \* \* \* \*